(12) United States Patent
Leger et al.

(10) Patent No.: US 10,894,284 B2
(45) Date of Patent: Jan. 19, 2021

(54) INSTALLATION TOOL FOR A BLIND FASTENER AND INSTALLATION PROCEDURE FOR A FASTENER

(71) Applicant: LISI AEROSPACE, Paris (FR)

(72) Inventors: Jean-Luc Leger, Vasselay (FR); Aurélien Bechard Bouquin, Saint Martin d'Auxigny (FR)

(73) Assignee: LISI AEROSPACE, Paris (FR)

( * ) Notice: Subject to any disclaimer, the term of this patent is extended or adjusted under 35 U.S.C. 154(b) by 15 days.

(21) Appl. No.: 16/299,466

(22) Filed: Mar. 12, 2019

(65) Prior Publication Data
US 2019/0283109 A1  Sep. 19, 2019

(30) Foreign Application Priority Data
Mar. 13, 2018  (FR) ..................................... 18 52169

(51) Int. Cl.
*B21J 15/04* (2006.01)
*B21J 15/10* (2006.01)
(Continued)

(52) U.S. Cl.
CPC ........... *B21J 15/045* (2013.01); *B21J 15/043* (2013.01); *B21J 15/10* (2013.01); *B21J 15/105* (2013.01);
(Continued)

(58) Field of Classification Search
CPC ............. F16B 19/1054; F16B 19/1072; Y10T 29/5373; B21J 15/02; B21J 15/043;
(Continued)

(56) References Cited

U.S. PATENT DOCUMENTS 3,277,689 A  * 10/1966  Anthony ................ B21J 15/045
                                                          29/243.522
3,309,911 A  *  3/1967  Simmons ............... B21J 15/043
                                                          29/243.524
(Continued)

FOREIGN PATENT DOCUMENTS

EP        0953390        11/1999
FR        3016417         7/2015

OTHER PUBLICATIONS

Charvet, Pierre, EPO Form 1503 "Rapport De Recherche Preliminaire", Nov. 27, 2018, 2 pages, Institut National de la Propriete Industrielle, France.
(Continued)

*Primary Examiner* — Jermie E Cozart
(74) *Attorney, Agent, or Firm* — Henricks Slavin LLP

(57) ABSTRACT

An installation tool for a fastener of the "pull screw" type, comprising a breakable gripping element includes a body, a first sleeve movable axially and rotationally in the body that can drive the gripping element, a second sleeve movable axially in the body and immovable in rotation, and a driving device provided with a turning shaft.
The shaft comprises a first free wheel for driving the first sleeve in rotation, a second free wheel, and a driving element positioned coaxially around the second free wheel. The driving element cooperates using a helical link with the second sleeve. The first free wheel drives the first sleeve in rotation in a first rotation direction of the shaft. The second free wheel brings the driving element in rotation in a second rotation direction of the shaft to move the second sleeve axially, allowing full setting in a single operating sequence.

11 Claims, 4 Drawing Sheets

(51) Int. Cl.
*B21J 15/36* (2006.01)
*F16B 19/10* (2006.01)
*B21J 15/12* (2006.01)
*B21J 15/26* (2006.01)
*B25B 27/00* (2006.01)
*B21J 15/16* (2006.01)
*B21J 15/02* (2006.01)
*B21J 15/14* (2006.01)

(52) U.S. Cl.
CPC ............... *B21J 15/12* (2013.01); *B21J 15/16* (2013.01); *B21J 15/26* (2013.01); *B21J 15/365* (2013.01); *B25B 27/0007* (2013.01); *F16B 19/1054* (2013.01); *F16B 19/1072* (2013.01); *B21J 15/022* (2013.01); *B21J 15/142* (2013.01); *Y10T 29/5373* (2015.01)

(58) Field of Classification Search
CPC ........ B21J 15/045; B21J 15/022; B21J 15/10; B21J 15/105; B21J 15/12; B21J 15/16; B21J 15/365; B21J 15/26; B21J 15/142; B25B 27/0007
See application file for complete search history.

(56) References Cited

U.S. PATENT DOCUMENTS

| | | | |
|---|---|---|---|
| 6,237,390 | B1 | 5/2001 | Honsel |
| 7,062,843 | B1* | 6/2006 | Lin ................... B21J 15/043 29/243.525 |
| 2004/0022596 | A1 | 2/2004 | Belanger |
| 2006/0026812 | A1* | 2/2006 | Villanueva ......... B25B 27/0014 29/243.53 |
| 2009/0031545 | A1* | 2/2009 | Keppel ................ B21J 15/105 29/243.53 |
| 2014/0130335 | A1 | 5/2014 | Bickford |
| 2015/0040373 | A1* | 2/2015 | Chen .................... B21J 15/32 29/525.06 |
| 2015/0196951 | A1 | 7/2015 | Bigot |

OTHER PUBLICATIONS

Charvet, Pierre, Form FR237 "Opinion Ecrite Sur La Brevetabilite De L'Invention", 5 pages, Institut National de la Propriete Industrielle, France.

* cited by examiner

INSTALLATION TOOL FOR A BLIND FASTENER AND INSTALLATION PROCEDURE FOR A FASTENER

This invention concerns an installation tool for a blind fastener in a structure.

A "blind" fastener is commonly referred to as a fastener that can be installed in structures to be assembled from a single side, called front or accessible side, by deforming a part of the fastener placed on the rear side, accessible or otherwise, of said structures. Deformation takes place radially outwardly during a pulling or torquing phase, to form a bulb or flaring, said deformation in abutment against the rear side. The structures to be assembled are thus held tight between a head of the fastener placed in abutment against the front face, and the deformed part in abutment against the rear face.

Among the types of blind fasteners, there is a first type called a "pull-thru" rivet, comprising a sleeve and a breakable mandrel linked together at one end of the fastener, with the rivet installed by applying only to the mandrel a pulling force while maintaining the sleeve stationary in translation, until fracture of the mandrel with application of a predetermined pulling force. A second type called a "screw rivet", comprises a threaded sleeve and a threaded mandrel, with the rivet installed by applying a torque only to the mandrel while maintaining the sleeve stationary in rotation, until fracture of the mandrel with application of a predetermined torque. A third type comprises blind nuts, comprising a threaded nut and a removable mandrel, with the nut installed by screwing the removable mandrel in the nut, by pulling or turning the mandrel until a given pulling or torque setpoint, then by unscrewing the mandrel from the installed nut. Finally, a fourth type called "pull-torqued", comprises a pin equipped with a head and a gripping element, and a threaded sleeve equipped with a collar, to which a relative pulling force is applied to move the position of the pin with respect to the threaded sleeve and deform a portion of the sleeve to form a bulb against the rear face of said structure. In this last type, the gripping element is broken with the application of a predetermined torque. Such a fastener is, for example, described in the FR3016417 application of the applicant.

One objective of the invention is to provide a manual installation tool for blind fasteners of the "pull-torqued" type.

For this, the invention provides an installation tool for a fastener in a structure via the front face of the structure.

The fastener comprises a shank with a head and a threaded end, a gripping element that can be fractured with the application of a predetermined fracture torque and a threaded sleeve able to be deformed outwardly to form a bulb against a rear face of said structure.

The installation tool comprises:
  a body, substantially of a revolution, extending along a longitudinal X axis, comprising at a first front end an axial opening allowing feedthrough of the gripping element and the fastener head,
  a first sleeve movable axially and rotationally in the body, capable of driving the gripping element of the pin in axial translation and in rotation around the X axis;
  a second sleeve movable axially in the body and immovable rotationally, said second sleeve being arranged to drive the first sleeve in axial translation;
  a rotational drive means comprising a rotary shaft provided with:
    a first free wheel which can drive the first sleeve in rotation in a first rotation direction of the shaft,
    a second free wheel that can rotate a driving element arranged coaxially around said second free wheel in a second rotation direction of the shaft, opposite to the first rotation direction, with the driving element cooperating via helical link with the second sleeve so as to move said second sleeve in axial translation.

The installation tool obtained is used to install blind fasteners of the "pull-torqued" type with a simple and mechanically robust architecture that requires few elements to achieve the pulling movement and rotation movement performed successively to install a fastener.

The installation tool for a fastener according to the invention also presents preferably all or some of the following characteristics, taken alone or in a technically operable combination:
  the driving element is a threaded pin, a ball screw, a roller screw or a worm screw.
  the first sleeve comprises movable elements adapted for cooperating with the blocking portion of the gripping element of the fastener to secure the fastener in the axial direction with the first sleeve.
  a first ring is positioned on the first sleeve to be capable of sliding between a first position in which the movement of movable elements is blocked in the radial direction and a second position in which the movement of movable elements is free in the radial direction.
  a second ring is capable of sliding along the axial direction on the body and interfaced with the first ring to bring the first ring only to the second position.
  the first free wheel is slidably mounted in the axial direction on the turning shaft.
  the first free wheel is mounted on a third ring slidable in the axial direction on the turning shaft.
  a compression spring is placed between the third ring and the driving element.
  a spring device is secured to an end of the driving element and to another end of the body; this spring device is tensioned upon rotation of the shaft in the second direction and slackens to push the driving element when the rotation of the turning shaft is stopped and/or reversed.
  the spring device is a torsion spring or a spiral spring.

The invention also concerns an installation procedure for a fastener using an installation tool according to the invention.

According to the procedure it consists of the following steps:
  engaging the gripping element for a fastener to be installed in the opening of the body of the installation tool to secure the fastener in translation and rotation with the first sleeve and engaging the fastener in an opening in the structure, then;
  rotating the shaft in the second direction to move the second sleeve in axial translation, which drives the first sleeve in axial translation in the pulling direction of the fastener pin, for a distance ensuring the formation of a bulb via deformation of the sleeve, then;
  rotating the shaft in the first rotation direction to drive the pin in rotation to the tightening torque of the pin for which the gripping element separates from the rest of the pin via a fracture at the level of a shear groove.

Other objects, features and advantages of the invention appear on reading the description of the invention creation procedures, a description relating to drawings in which.

To facilitate understanding of the drawings, only the elements necessary for understanding the invention are shown. The same elements have the same references from one drawing to another.

Attention is drawn to the fact that the cross-sections of the nose equipment presented on the various figures are not shown in the same axial plane. In particular, views 2, 3 and 7 are shown in a first axial plane and views 4, 5 and 6 are shown on another axial plane.

Figure 1:
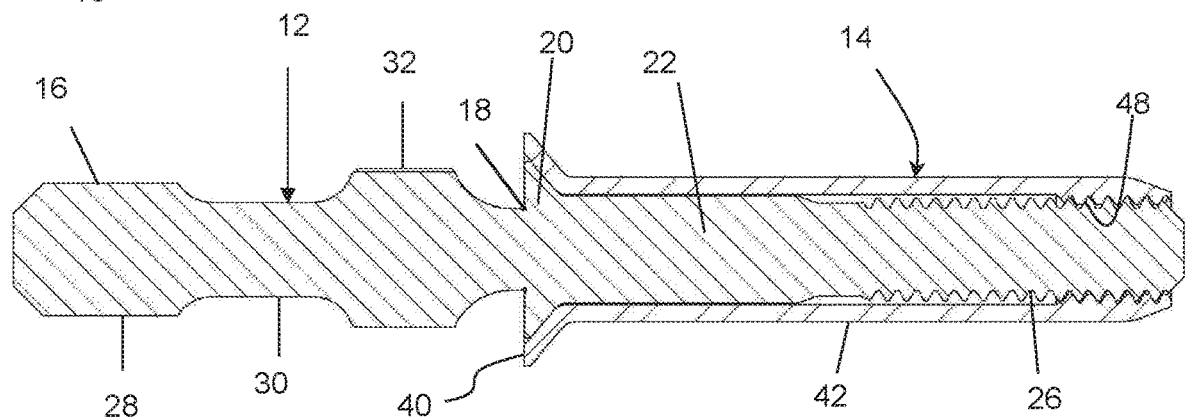
FIG. 1 is a cross-section of a blind fastener of the prior art of the "pull-torqued" type.

With reference to FIG. 1, a blind fastener 10 of the "pull-torqued" type to which the invention applies comprises a pin 12 and a sleeve 14. The pin 12 comprises a gripping element 16 capable of being broken during installation of the fastener, a rupture groove 18, a countersunk head 20, a cylindrical shank 22 and a threaded end 26. The gripping element 16 comprises a first gripping portion 28 in the form of a cylinder, a blocking portion 30 and a second gripping portion 32, comprising splines distributed over the external surface.

The sleeve 14 comprises an enlarged collar 40 capable of receiving the countersunk head 20, and a tubular shank 42 including a tapping 48, placed at the end of the sleeve 14, opposite the collar 40. The thread of the pin 12 and the tapping of the sleeve 14 are complementary. The tubular shaft 42 comprises a deformable zone, not indicated on the drawing, with a stiffness less than the stiffness of other portions, capable of forming a bulb when pulling is applied.

Figure 2:
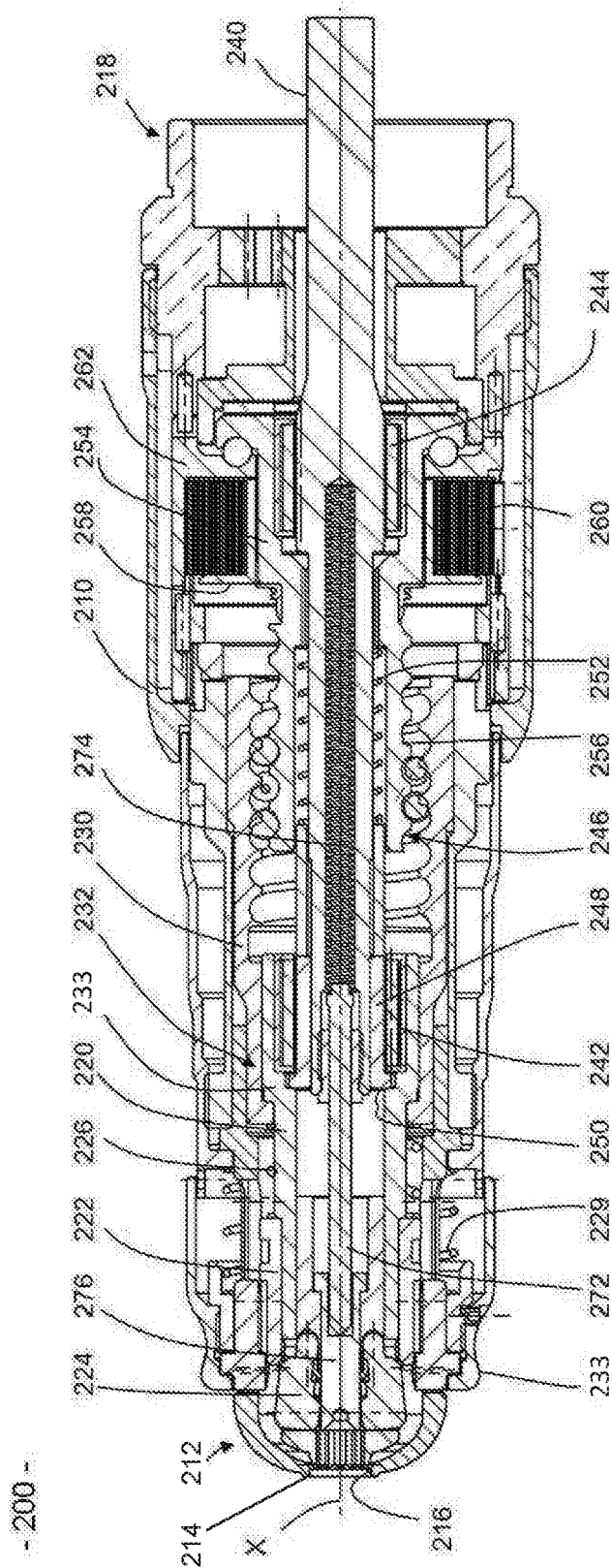
FIG. 2 is a cross-section of the installation tool in a resting configuration.

FIG. 2 is a cross-section of the nose equipment 200 of a tool adapted to installation of a blind fastener 10 previously described. The equipment nose comprises a body 210, substantially a revolution, substantially cylindrical, hollow extending along an axis X, including a first end 212 and a second end 218 opposite the first. For convenience, in the remainder of the description the first end 212 is called the front end and indicates the "forward" direction, whereas the second end is called the rear end and indicates the "rearward" direction. The terms "in translation" and "axially" are used in an equivalent manner to designate a linear movement along the X axis.

The front end of the body (210) comprises a contact surface 214 arranged to enter into contact with the collar 40 of the threaded sleeve, and an opening 216 sufficient in diameter to enable passage of the gripping element 16 and the head 20 of the pin 12 within said body.

The body 210 receives a first sleeve 220, movable in rotation and in translation within said body. The first sleeve is of a substantially tubular revolution around the X axis of the body. It extends between the first end close to the front end 212 of the body, and a second opposite end. A first ring 222 is located on a first portion of the first sleeve 220 adjacent to the first end of the first sleeve. The elements 224, distributed around the axis, movable in at least one component of the radial direction are maintained within the body 210 between the front end 212 of the body and the first sleeve 220. The first ring 222 is movable axially on said first portion of the first sleeve, between a first position in which the movable elements are partially surrounded by the first ring 222 (FIG. 2) and free to move radially, and a second position in which the movable elements are totally surrounded by the first ring 222 (FIG. 3) that blocks their movement in the radial direction.

A first compression spring 226 is located between the first ring 222 and a second sleeve 230. Under the effect of the first compression spring 226, the first ring 222 is pushed axially forward. In the resting position of FIG. 2, the travel of the first ring 222 forward is limited by the movable elements 224 whose ends closest to the front form a cone presenting an external diameter greater than the internal diameter of the first ring 222.

A second ring 228 is positioned around the body 210, close to the front end 212 of said body. The second ring 228 can slide along the body toward the rear, against a second compression spring 229.

The second sleeve 230 is housed within the body 210. It is movable axially within the body but maintained immovable in rotation. The second sleeve in revolution is substantially tubular around the X axis of the body and extends between, at the front, an end of a first portion 232 close to the second end of the first sleeve 220, and at the rear, a second opposite end. The second sleeve 230 comprises an outside surface of type six or eight faces engaged in the surfaces complementary to the body 210 to immobilize the second sleeve in rotation in the body. Other anti-rotation devices enabling translation are possible, like retainer devices, keys or other splices.

The first portion 232 of the second sleeve covers a second portion 233 of the first sleeve 220, adjacent to the second end of the first sleeve. A surface external to the second portion 233 of the first sleeve forms an external shoulder and an internal surface of the first portion 232 of the second sleeve forms a stop, close to the front end of said first portion of the second sleeve, receiving the shoulder of the first sleeve. The shoulder and the stop comprise the complementary bearing surfaces enabling the transfer of a translation movement of the second sleeve 230 to the first sleeve 220 toward the rear end 218 of the body. Other drive means can be used in translation of the first sleeve.

The body 210 also comprises a driving means able to drive the first sleeve 220 in translation and in rotation, and able to drive the second sleeve 230 in translation. The driving means comprise a shaft 240 extending along the X axis between the second end of the first sleeve 220 and the rear end 218 of the body. The shaft is rotatably mounted around a longitudinal axis of said shaft and can be rotated in the two possible rotation directions around its axis. In the front, the shaft is equipped at a first end with a first free wheel 242, positioned at an interface with the second portion 233 of the first sleeve 220. The shaft comprises at a second end near the rear end 218 of the body a driving means for rotation (not shown) that can bring the shaft in a rotation direction and in the reverse direction. A second free wheel 244 is arranged around the shaft 240, adjacent axially between the first free wheel 242 and the driving means for rotation of the shaft. A driving element 246 is arranged coaxially around the second free wheel 244.

Each free wheel 242, 244 conventionally comprises an internal ring and an external ring such that, in a rotation direction, the free wheel turns freely without securing the internal ring with the external ring—a phase called free wheel, and in the other rotation direction the internal ring is secured to the external ring and transfers a torque to the part linked to the external ring.

The first free wheel 242 is positioned to drive the first sleeve 220 in rotation during a rotation of the shaft in a first rotation direction. The second free wheel 244 is positioned to drive the driving element 246 in rotation during a rotation of the shaft in a second rotation direction, reverse to the first rotation direction. The free wheels 242 and 244 are in free wheel phase in opposite directions of rotation. The first free wheel 242 transfers a torque in the rotation direction identical to the screwing direction of the pin 12 in the sleeve 14.

The first free wheel 242 is slidably mounted along the shaft 240 using a third ring 248 coaxial with the shaft that can slide on the shaft. The third ring 248 and the shaft 240 are secured in rotation, for example, via a hexagonal face or another anti-rotation form, or via any other mechanical means such as a retainer device or key. The third ring 248 comprises a stop 250 in bearing, on the one hand, against an internal shoulder of the second portion 233 of the first sleeve, and on the other hand, against the first free wheel 242. A third compression spring 252 is housed around the shaft 240, between an internal shoulder of the driving element 246 and the third ring 248.

The driving element 246 comprises a first portion 254 positioned coaxially around the second free wheel 244, and a second portion 256 extends coaxially around the shaft, at a distance from the shaft. In this example, the first portion 254 of the driving element comprises an external driving surface for rotation, for example, for example a hexagonal faces, and the second portion 256 of said driving element comprises an external surface of ball screw type. The ball screws cooperate with an internal surface of the second sleeve 230 of the ball screw type. Due to the helical link between the driving element 246 and the second sleeve 230, and the fact that the second sleeve 230 is immovable in rotation in the body 210, the rotation of the driving element 246 brings the translation of the second sleeve 230 toward the rear of the body when the shaft is subjected to a rotation in the direction of transmission of the torque of the second free wheel. In this rotation direction, the first free wheel 242 is in free wheel condition and does not bring the first sleeve into rotation.

Other types of helical links between the driving element and the second sleeve are possible, such as links using traditional pins/nuts, roller screws or worm screws.

The first portion 254 of the driving element 246 forms a collar 258 extending radially outwardly. A spiral spring 260 is housed in the radial direction in the body 210 around the first portion 254 of the driving element, an end of said spring being secured to said first portion 254, whereas the other end is secured to the body 210. The spiral spring is contained in the axial direction between the collar 258 of the first portion of the driving element and a stop 262 of the body. The spiral spring 260 is tightened on itself when the shaft is subject to a rotation in the blocking rotation direction of the second free wheel 244. The spiral spring unwinds when the shaft is subject to a rotation in the reverse rotation direction.

As a variant, the spiral spring can be replaced by a torsion spring. The spiral spring is less cumbersome and provides more adjustment latitude than the torsion spring.

The installation tool also comprises an ejector comprising a rod 272 of which one end can slide in the shaft 240, a fourth compression spring 274 housed in a space within the shaft 240 and pushing the rod 272. The ejector also comprises a bearing element 276 positioned at an end opposite the rod 272, which can slide in the first sleeve 220 and bears against an external surface of the first portion 28 of the gripping element 16 of the pin. In resting state, in which no fastener is inserted in the equipment nose, the bearing element 276 of the ejector is pushed by the fourth compression spring 274 forward to face the opening 216 of the body 210.

The installation procedure for a blind fastener 10 using the equipment nose 200 will now be described, in relation to the FIGS. 3 to 7.

Figure 3:
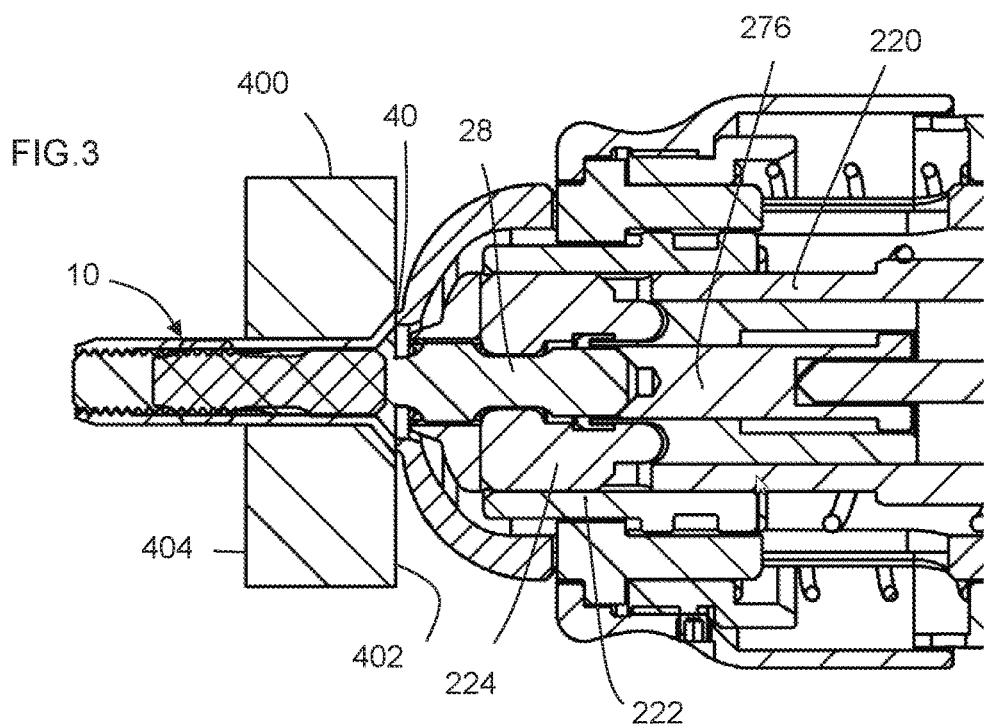
FIG. 3 is a cross-section of the installation tool and the fastener from FIG. 1 in a configuration in which the fastener is inserted in the installation tool and through a structure.

In a first step, an operator grips a fastener 10 in a state represented in FIG. 1 and inserts it via the front opening 216 of the body. The gripping portion 28 of the pin pushes the movable elements 224 radially outwardly which click into place in the blockage portion 30 of the fastener once the first gripping portion 28 of the pin is completely inserted in the equipment nose (FIG. 3). The movable elements 224 thus present an external diameter less than the internal diameter of the first ring 222, which is free to slide forward under the action of the first compression spring 226, so as to capture the movable elements around the gripping portion of the fastener (FIG. 3) and to block the fastener 10 in the equipment nose in the axial direction.

When the first portion 28 of the gripping element is entirely contained in the equipment nose 200, the bearing element 276 of the ejector, pushed rearward, compresses the fourth compression spring 274 in the shaft 240.

The fastener 10 is then inserted in at least two elements of structure 400 to be assembled, presenting a front face 402, next to which the fastener is inserted, and a blind face 404 opposite to the front face. For simplicity, the structure is represented generally on FIGS. 3 to 6 without representing the elements that are assembled to constitute it. The contact surface 214 of the body lies on the collar 40 of the fastener.

The first step consists of forming a bulb against the blind face 404 of the structure. To do this, the shaft 240 is rotated in the rotation direction of the second free wheel 244. The spiral spring 260 is tensioned, a translation is imposed on the second sleeve 230 via the pin/ball nut link. The second sleeve 230 moves rearward (FIG. 4—arrow F1) and drives the first sleeve 220 by engaging the bearing surfaces of the shoulder of the first sleeve 220 and the first stop of the second sleeve 230, as well as the third ring 248 positioned around the shaft, thereby causing the first free wheel 242 rearward, and compressing the third compression spring 252.

Figure 4:
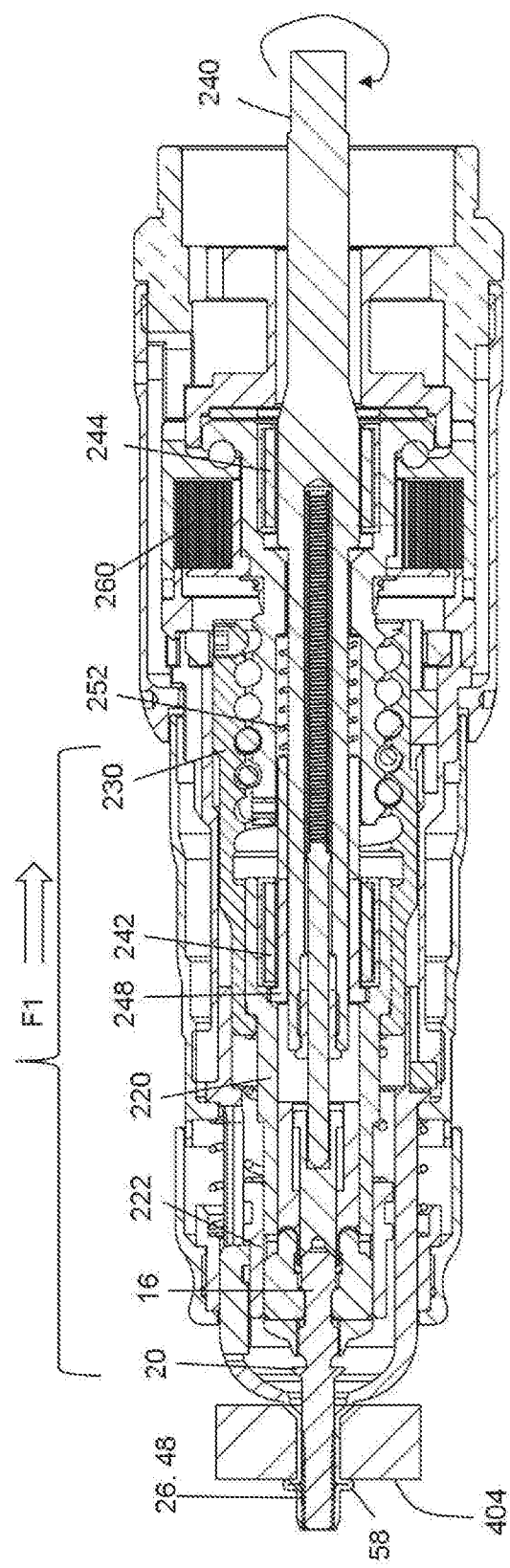
FIG. 4 is a cross-section of the installation tool and the fastener inserted in a structure during a bulb formation step.

The first sleeve 220 and the first ring 222 drive the gripping element 16 of the pin rearward, and thus the threaded portion 26 of the pin and the tapping 48 of the sleeve toward the blind face 404 of the structure, until the formation of a bulb 58 of which a face comes in abutment against the blind face 404. The head 20 of the pin 12 is thus contained in the body 210 of the installation tool. The contact surface 214 of the body still holds the sleeve 14 in the structure 400 (FIG. 4).

The second step consists of screwing the pin 12 in the sleeve 14 to bring the head 20 of the pin in the collar 40 of the sleeve. The rotation exerted on the shaft 240 is stopped and a reverse rotation movement is imposed. The combined actions of the spiral spring 260 and the third compression spring 252 drives the second sleeve 230 in translation and the third ring 248 forward (FIG. 5, arrow F2), whereas the rotation of the shaft in the rotation direction of the first free wheel 242 brings the first sleeve 220 into rotation in the screwing direction of the pin, in the forward direction. In this rotation direction, the second free wheel 244 is in free wheel phase, and does not bring the driving element in rotation 246.

Figure 5:
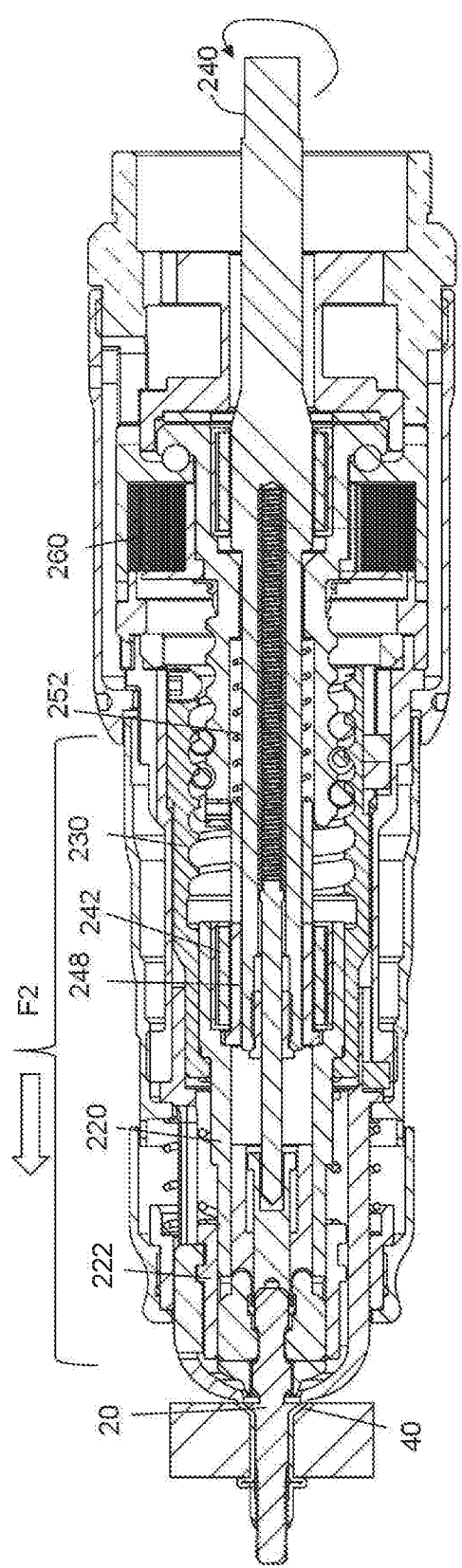
FIG. 5 is a cross-section of the installation tool and the fastener inserted in a structure during a torquing step.

FIG. 5 illustrates the end of this movement: the first sleeve 220, the second sleeve 230, the first free wheel 242 and the third ring 248 are returned to their initial position as seen in FIG. 2, the head 20 of the pin once again in abutment against the collar 40 of the sleeve.

Figure 6:
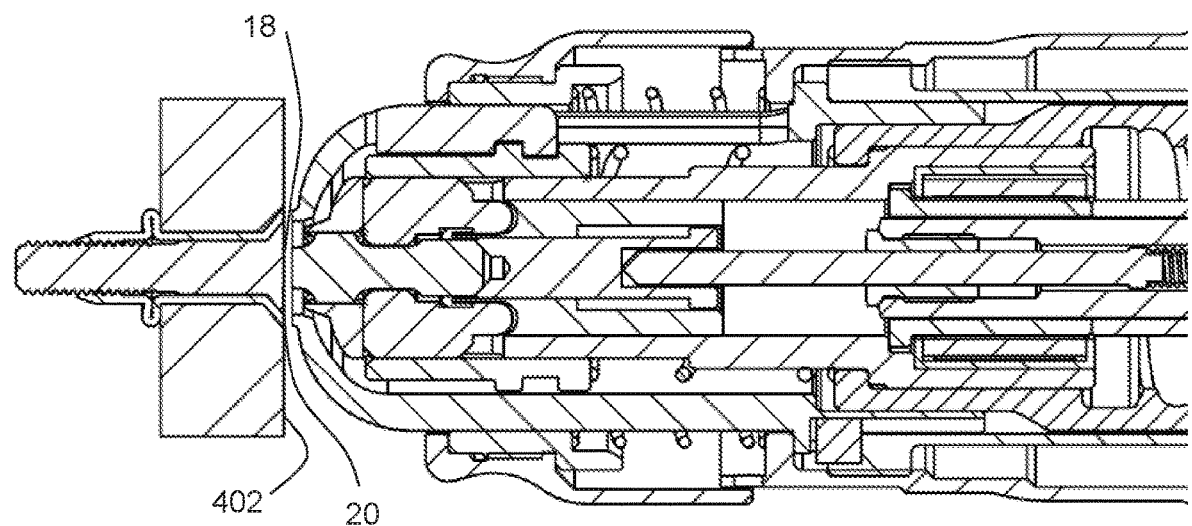
FIG. 6 is a detailed cross-section of the installation tool and the fastener inserted in a structure during a fracture step of the gripping element of the fastener.

The third step consists of finalizing the installation of the rivet by fracturing the gripping element 16 of the pin by continuing to turn the shaft 240 in the rotation direction of the first free wheel 242. The rupture groove 18 is designed to fracture beyond a certain tension torque ensuring the desired tightening for the fastener. It therefore fractures once the threshold is reached, leaving the head 20 flush with the front surface 402 of the structure (FIG. 6).

Figure 7:
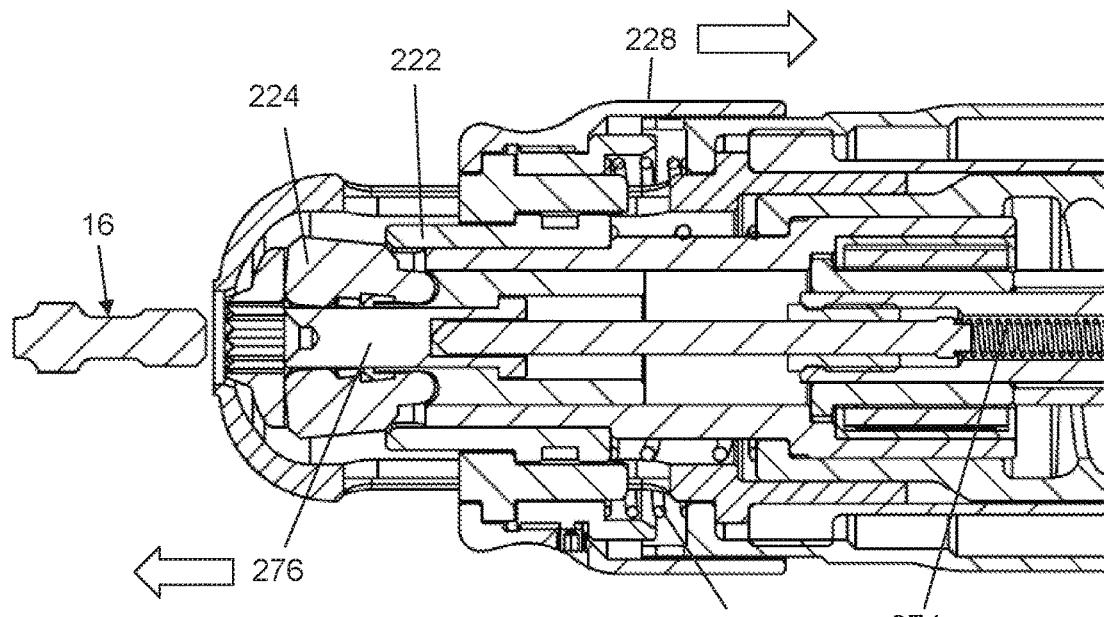
FIG. 7 is a detailed cross-section of the installation tool and the broken gripping element of the fastener during an ejection step.

To eject the broken gripping element 16, the operator grips the second ring 228 and pulls it rearward of the body. Using a retainer system, the first ring 222 is pulled rearward (FIG. 7). In doing so, the first ring 222 frees the front end of the movable elements 224 which are once again radially movable. The ring 222 no longer maintaining the movable elements 224 in the blocking portion 30 of the gripping element 16, the bearing element 276 of the ejector is pushed forward under the action of the fourth compression spring 274, which ejects the gripping element 16 from the equipment nose 200. The ejector also pushes the movable elements radially, which take their initial positions in FIG. 2, holding the first ring 222 in a rear position when the operator releases the second ring 228, and the second compression spring 229 returns the second ring 228 to the initial position of FIG. 2. Another blind fastener can be installed according to the same procedure.

This manual installation tool manual can be used with all fasteners of "pull-torqued" type by adapting the movable elements 224 and the gripping means of the sleeve 220 to the shape of the gripping element 16 of the pin.

Of course, the installation tool 200 can also install fasteners with protruding heads.

The invention claimed is:

1. An installation tool for a fastener in a structure via a front face of said structure, said fastener being of the type including a pin comprising a shank with a head and a threaded end, a gripping element that can be fractured with the application of a predetermined fracture torque and a threaded sleeve capable of becoming deformed outwardly to form a bulb against a rear face of said structure:
    a hollow cylindrical body extending along a longitudinal X axis comprising a first end in front of an axial opening allowing feedthrough of the gripping element and the fastener head,
    a first sleeve movable axially and rotationally in the body, capable of driving the gripping element of the pin in axial translation and in rotation about the X axis;
    a second sleeve movable axially in the body and immovable in rotation, said second sleeve being arranged to drive the first sleeve in axial translation;
    means for rotation about the X axis comprising a turning shaft provided:
        with a first free wheel that can drive the first sleeve in rotation in a first rotation direction of the shaft, and
        with a second free wheel that can rotate a driving element positioned coaxially around said second free wheel in a second rotation direction of the shaft, opposite to the first rotation direction, with the driving element cooperating via helical link with the second sleeve so as to move said second sleeve in axial translation.

2. The installation tool for a fastener as claimed in claim 1, in which the driving element is a threaded pin, a ball screw, a roller screw or a worm screw.

3. The installation tool for a fastener as claimed in claim 1, in which the first sleeve comprises movable elements capable of cooperating with a blocking portion of the gripping element of the fastener to secure said fastener in the axial direction with said first sleeve.

4. The installation tool for a fastener as claimed in claim 3, comprising a first ring positioned on the first sleeve capable of sliding between a first position in which the movement of the movable elements is blocked in the radial direction and a second position in which the movement of movable elements is free in the radial direction.

5. The installation tool for a fastener as claimed in claim 4, comprising a second ring capable of sliding according to the axial direction on the body and interfaced with the first ring to bring the first ring only to the second position.

6. The installation tool for a fastener as claimed in claim 1, in which the first free wheel is assembled slidingly along the axial direction on the shaft.

7. The installation tool for a fastener as claimed in claim 6, in which the first free wheel is assembled on a third ring assembled slidingly along the axial direction on the shaft.

8. The installation tool for a fastener as claimed in claim 7, in which a compression spring is positioned between the third ring and the driving element.

9. The installation tool for a fastener as claimed in claim 1, including a spring device attached to an end of the driving element and another end to the body, this spring device is tensioned during rotation of the shaft in the second direction and slackens to push the driving element when the rotation of the turning shaft is stopped and/or reversed.

10. The installation tool for a fastener as claimed in claim 9, in which the spring device is a torsion spring or a spiral spring.

11. Installation procedure for a fastener using the installation tool in accordance with claim 1, such procedure comprising the following steps:
    engaging a gripping element of a fastener to be installed in the opening of the body of the installation tool to secure said fastener in translation and rotation with the first sleeve and engaging the fastener in a perforation in the structure, then;
    rotating the shaft in the second direction to move the second sleeve in axial translation which brings the first sleeve in axial translation in the pulling direction of the fastener pin for a distance ensuring the formation of a bulb in a threaded sleeve of the fastener via deformation of the threaded sleeve, then;
    rotating the shaft in the first rotation direction to bring the pin in rotation up to the fracture torque of the pin for which the gripping element separates from the rest of the pin via a fracture in a shear groove on the pin.

* * * * *